INVENTOR
Gaston MARIER

BY
ATTORNEY

United States Patent Office 3,285,677
Patented Nov. 15, 1966

3,285,677
REINFORCED ENDLESS RUBBER BELT
Gaston Marier, 2780 Langelier Blvd., Montreal, Quebec, Canada
Filed Sept. 21, 1964, Ser. No. 397,841
1 Claim. (Cl. 305—38)

The present invention relates to improvements in the manufacture of endless driving tracks for vehicles and more particularly to an improved construction of an endless driving track for a snow traveling vehicle capable of operating in forwards and backwards travel.

There is at present, an ever increasing use of small snow traveling vehicles of the type used in sport for the transportation of one or two persons and which consists essentially of a light chassis, usually open, with the front portion supported and steered by a pair of skids or short skis and having as a main supporting and driving means a single endless track. This track is supported for travel about a suspension system of resiliently biased rollers and is generally driven directly by engagement with driving sprockets connected to a small internal combustion engine. The track itself is usually provided with gear engaging openings along each side which in effect function as parallel driving chains. This means that the endless belt in addition to being sufficiently pliable to readily flex about the suspension system must also be sufficiently strong at the portions between the sprocket openings to withstand the driving push of the sprocket teeth in either direction without substantial deformation in order to withstand wear and tear during operations of the vehicle. Further, the main web of the track intervening the sprocket openings must be sufficiently stiff to withstand undue deformation as may be caused by the vehicle passing over obstruction and to maintain the parallel relationship of the sprocket engaging openings from one side of the track to the other.

Having all of the above requirements in mind the invention aims to provide an improved endless track construction which is designed to fully meet such requirements. More specifically the invention is embodied in the construction of an endless track having its exterior surface made of tough resilient material such as synthetic rubber or the like with the ground engaging surface shaped or molded to provide a plurality of regularly spaced projecting studs or corrugations to provide the necessary gripping surfaces for travel on snow or ice. In order to provide the necessary longitudinal flexibility and transverse rigidity the endless track of the invention is made as having a composite structure in cross section having in addition to the outer surface layers of synthetic rubber or the like internal layers of metallic and non-metallic mesh materials which supply the necessary non-stretchable strength and reinforcement.

Having thus generally described the nature of the invention, particular reference will be made to the accompanying drawings illustrating a preferred embodiment thereof, and in which.

Figure 1:
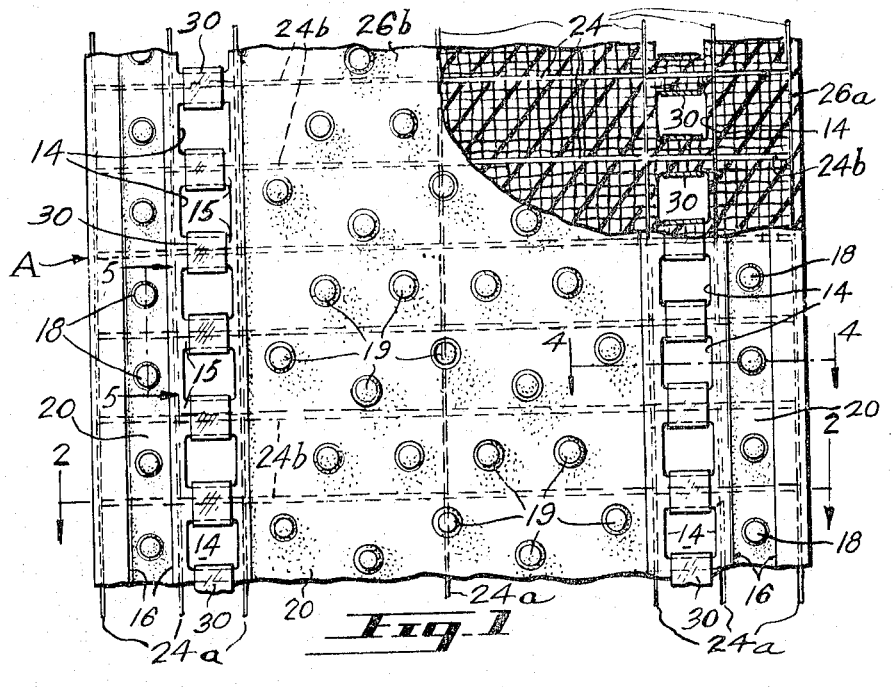
FIGURE 1 is a view in plan of a section of an endless driving track constructed in accordance with the invention with the composite layers broken away to show their position and composition relative to the external configuration of the track.

With particular reference to the drawings, the endless track construction of the invention is made as an endless belt having a section, a portion of which is shown in FIGURE 1.

Figure 2:
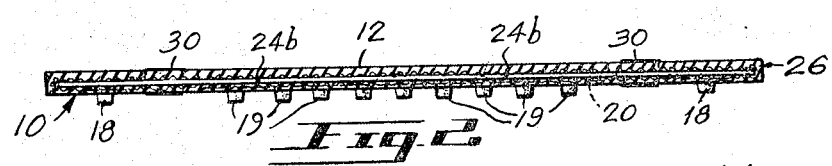
FIGURE 2 is a cross-sectional view of the track construction shown in FIGURE 1 as seen along the line 2—2 to show the central layers of metallic rod or wire mesh encased in the non-metallic mesh layers and the resilient material making up the main body of the track.
Figure 3:
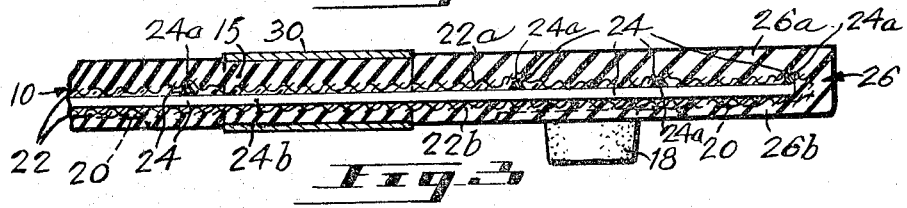
FIGURE 3 is a greatly enlarged sectional view of a portion only of the section shown in FIGURE 2 to show the relationship and relative dimensions of the internal layers more clearly.

As seen generally in FIGURE 2 the track 10 is formed, preferably by molding, so as to have a substantially flat inner surface 12 adapted to engage with and ride on the carrying rollers of the suspension system and to meet the base surfaces of the usual driving sprockets (not illustrated). The track 10 is formed so as to provide parallel rows of sprocket tooth engaging openings 14 adjacent each marginal edge, the aligned rows of openings 14 being bordered at each outside edge by a continuous groove or recess 16 within which there is provided an aligned row of studs or grippers 18 which extend beyond the ground contacting surface 20 to provide traction means which aid in the maintaining of the driving traction portion of the vehicle in a straight line. The central main portion of the track outer surface 20 is provided with a plurality of similar gripping studs 19 which are aligned in a pattern giving maximum clearance between individual studs to avoid clogging with snow, and yet, as shown in FIGURE 2, present closely aligned rows of ground gripping protuberances when viewed at the ground line across the width of the track to provide maximum traction.

Figure 4:
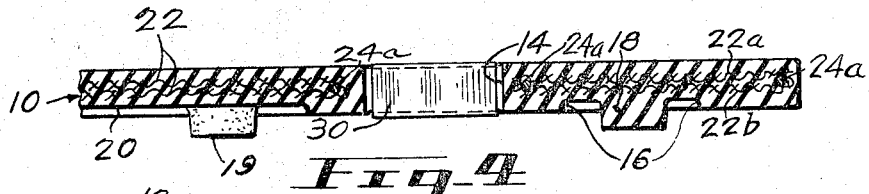
FIGURE 4 is a further enlarged cross-sectional view as seen along the line 4—4 of FIGURE 1.
Figure 5:
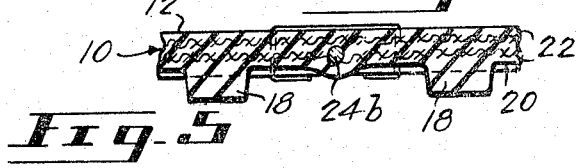
FIGURE 5 is an enlarged cross-sectional view of the construction of FIGURE 1 as seen along the line 5—5.

A main feature of the present invention resides in the construction and arrangement of the internal reinforcing layers 22, 24 which, when embodied with the major body layers 26 of resilient material such as synthetic rubber, provide the necessary strength and resistance to deformation required particularly at the portions of the track 10 having the sprocket engaging openings 14. As shown most clearly in FIGURES 1 and 4, the central layers of the present track are made up of an outer layer of resilient material 26a, a first layer 22a of non-metallic mesh, for example nylon, a central layer of metallic mesh 24, a further layer 22b of non-metallic mesh and the other outer layer 26b of resilient material. The central layer of metallic mesh 24 is formed so as to have relatively light longitudinal portions 24a in order that they may freely flex as required while the cross members 24b or transverse portions are considerably heavier to serve their dual purpose of transverse cross bracing and reinforcement between the sprocket engaging teeth. As is shown, the cross members 24b are regularly located in the web formation so as to correspond with the spacing between the sprocket tooth engaging openings 14 so that when the mesh 24 is embodied in the track a cross portion 24b extends between each opening 14 at each side to a connection with the longitudinal members 24a edging the mesh adjacent each marginal edge. The additional longitudinal members 24a bordering the aligned row of openings 14 add to the reinforcing qualities of the members 24b and as the whole mesh 24 is embodied in and surrounded by the non-metallic web layers 22a, 22b which in themselves are imbedded as an integral part of the main resilient layers 26a, 26b with this arrangement there is provided an extremely strong longitudinally flexible, yet transversely semi-rigid, endless belt forming the track of the invention.

As an additional reinforcement, in the preferred construction illustrated, a metal clip 30 is provide as covering each intervening portion 15 between the sprocket tooth receiving openings 14.

I claim:

An endless driving track for use on a snow-traveling vehicle or the like including direct-driving sprockets, comprising an endless belt having a flat inner surface and an outer surface, said belt including mutually parallel rows of spaced openings disposed inwardly along each side marginal edge of said belt, said belt including a plurality of integral studs depending from the outer surface of said belt, said studs being disposed intermediately of said belt side margins and the respective rows of openings and between said rows of openings, said rows of studs being disposed in a pattern minimizing impaction of material therebetween and maximizing traction over the surface over which the track will travel, said belt comprising a composite construction having outer layers of a resilient material having intimately embedded therebetween an inner central layer metallic mesh and upper and lower layers of non-metallic mesh, said metallic mesh including outer, flexible longitudinally disposed web members positioned immediately adjacent the side margins of said belt and inner pairs of flexible, longitudinal web members respectively immediately flanking said respective rows of openings, said metallic mesh including transverse web members integrally connected to said longitudinal web members and positioned in intervening belt portions between adjacent openings in said belt, said transverse web members having a cross sectional modulus greater than that of said longitudinal web members, and rigid clips circumposed about said intervening belt portions between adjacent belt openings and clampingly engaging the resilient material thereat whereby forces applied by the direct-driving sprockets at said openings are substantially distributed throughout the composite belt.

References Cited by the Examiner
UNITED STATES PATENTS

| | | | |
|---|---|---|---|
| 2,219,221 | 10/1940 | Carchidi | 305—38 |
| 2,449,421 | 9/1948 | Slemmons | 305—38 |
| 2,476,460 | 7/1949 | Smith | 305—38 X |
| 2,476,828 | 7/1949 | Skromme | 305—38 |
| 2,899,242 | 8/1959 | Bombardier | 305—38 |

BENJAMIN HERSH, *Primary Examiner.*

LEO FRIAGLIA, *Examiner.*

R. J. JOHNSON, *Assistant Examiner.*